United States Patent [19]

Bellenger

[11] Patent Number: 4,675,898
[45] Date of Patent: Jun. 23, 1987

[54] SINGLE TONE TELEPHONE RECEIVER

[75] Inventor: Donald M. Bellenger, Los Altos Hills, Calif.

[73] Assignee: Buscom Systems, Inc., Santa Clara, Calif.

[21] Appl. No.: 679,164

[22] Filed: Dec. 7, 1984

[51] Int. Cl.⁴ .............................................. H04M 1/50
[52] U.S. Cl. ..................................... 379/97; 379/356; 379/386
[58] Field of Search ................. 179/2 A, 2 AM, 2 D, 179/5 R, 5 P, 84 VF, 90 BD, 90 BB, 90 B; 340/310 A, 310 R, 825.71, 825.72, 825.73, 825.74, 825.75; 379/93, 97, 102, 355, 386

[56] References Cited

U.S. PATENT DOCUMENTS

| | | | |
|---|---|---|---|
| 3,537,001 | 12/1968 | Friend | 179/84 VF |
| 3,647,973 | 3/1972 | James et al. | 179/2 DP |
| 3,790,720 | 2/1974 | Schartmann | 179/84 VF |
| 3,935,395 | 1/1976 | Ball | 179/84 VF |
| 3,949,177 | 4/1976 | Ball | 179/84 VF |
| 3,971,897 | 7/1976 | Ohl | 179/84 VF |
| 4,016,370 | 4/1977 | Laoteppitaks | 179/84 VF |
| 4,042,788 | 8/1977 | Richards | 179/84 VF |
| 4,042,789 | 8/1977 | Richards | 179/84 VF |
| 4,061,885 | 12/1977 | Nash et al. | 179/84 VF |
| 4,326,256 | 4/1982 | Furumoto | 364/484 |
| 4,332,985 | 6/1982 | Samuel | 179/90 BD |
| 4,356,348 | 10/1982 | Smith | 179/1 MN |
| 4,415,774 | 11/1983 | Driver | 179/2 DP |
| 4,450,320 | 5/1984 | Ostermann et al. | 179/5 R |
| 4,475,009 | 10/1984 | Rais et al. | 179/2 A |
| 4,547,629 | 10/1985 | Corless | 179/81 R |

OTHER PUBLICATIONS

IBM Tech. Disclosure Bulletin, "Telephone Call Progress Detection Method", Oct. 1985, vol. 28, No. 5, pp. 1864-1865.

Primary Examiner—Gene Z. Rubinson
Assistant Examiner—M. Connors
Attorney, Agent, or Firm—Townsend & Townsend

[57] ABSTRACT

A single-tone receiver for a device which only needs simple data which can be encoded in the seven or eight single tones which can be generated by an ordinary pushbutton telephone is provided. A telephone line interface circuit receives a signal from the telephone line. The input signal is not filtered to separate the high-frequency tones from the low-frequency tones prior to their detection. A zero crossing detector coupled to the telephone line interface detects zero crossings of a received single-tone input signal. A microprocessor coupled to the zero crossing detector counts the number of zero crossings in a period and compares the count to counts corresponding to each of the seven single-tone frequencies.

3 Claims, 2 Drawing Figures

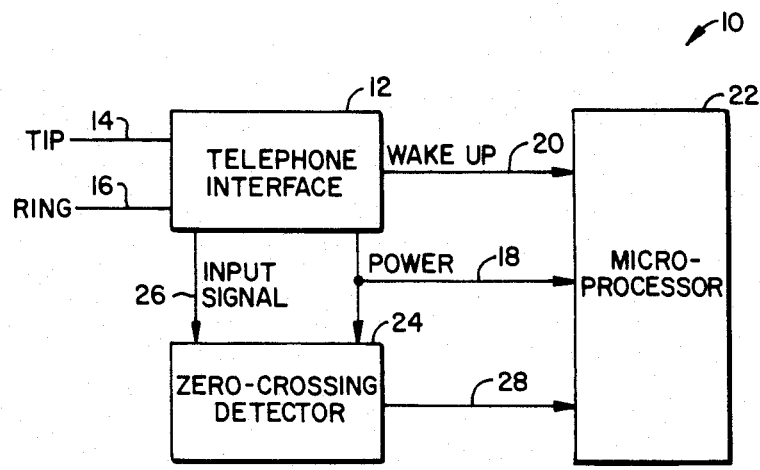
FIG.—1.

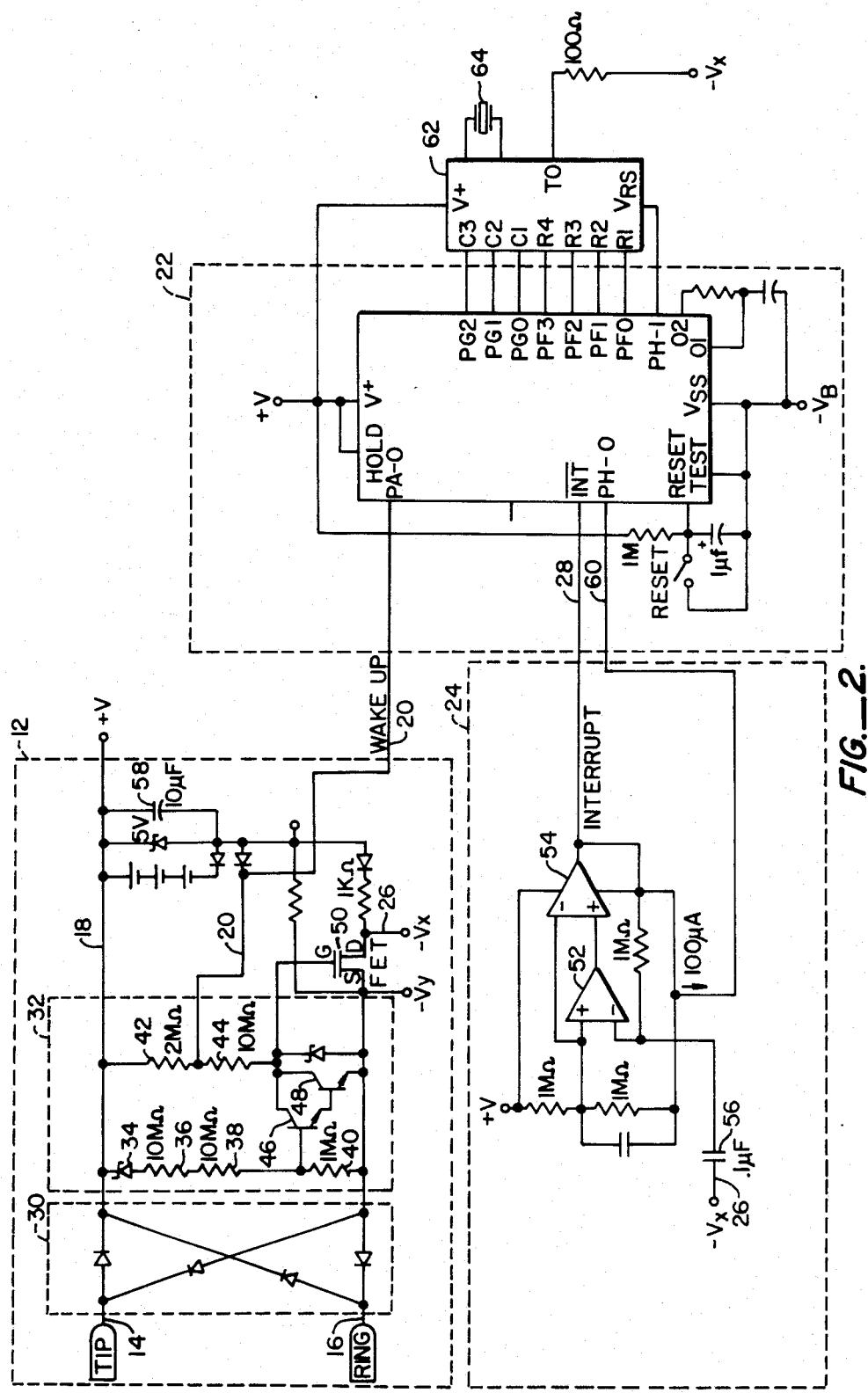
FIG._2.

SINGLE TONE TELEPHONE RECEIVER

BACKGROUND OF THE INVENTION

This invention relates to data communication over telephone lines utilizing tone signals.

Pushbutton telephones use Dual Tone Multi-Frequency (DTMF) signals for transmission of numbers. Each button on the telephone generates a low and a high frequency signal corresponding to the row and column, respectively, in which that particular button is located on the telephone. The resulting DTMF signal is a composite signal consisting of a high frequency tone and a low frequency tone. The presently used frequencies are 697 Hz, 770 Hz, 852 Hz and 941 Hz for the low-frequency group and 1209 Hz, 1336 Hz and 1477 Hz for the high-frequency group. There is room for expansion to eight frequencies by adding another column.

Such a pushbutton telephone can be used to input data to a computer as shown by James et al., U.S. Pat. No. 3,647,973. As recognized by James, a single tone can be generated by depressing two buttons in any row or any column. This feature was an accidental by-product of the original design of the pushbutton phone, which had been deliberately copied in later phones. Basically, a single transistor is coupled to two LC circuits, one for the rows and one for the columns. The capacitors are coupled to different points on the inductor when a button is depressed. The depression of two rows (or two columns) results in the transistor not operating within its precisely defined linear range, and no row frequency (or column frequency) is produced. Thus, by pressing two buttons in the first row, for example, the tone 697 Hz will be produced. The James method uses such single tones for control signals and the standard DTMF tones for data signals. The use of the single tones thus adds to the complexity of the DTMF receiver used.

DTMF decoding requires the detection of two superimposed frequencies and thus requires sophisticated filtering. A simplified method of decoding DTMF signals involves using high and low band pass filters to separate the high frequencies from the low frequencies. In each of the separate channels thus generated, the zero crossings of the received signal are counted and compared to zero crossing counts corresponding to the respective frequencies. However, such a system still requires high and low band pass filtering. Examples of such a system, which are typically used for inputting signals to a computer, are shown in the following patents:

Laoteppitaks, U.S. Pat. No. 4,016,370
Schartmann, U.S. Pat. No. 3,790,720
Richards, U.S. Pat. No. 4,042,789
Friend, U.S. Pat. No. 3,537,001
Ball, U.S. Pat. No. 3,935,395
Ball, U.S. Pat. No. 3,949,177
Ohl, U.S. Pat. No. 3,971,897

DTMF receivers are typically not used with ordinary home telephones because of their complexity and corresponding high cost. Thus, devices which can be coupled to an ordinary home telephone, such as an answering machine, are typically not remotely controllable from a pushbutton phone. A few devices use a DTMF receiver with a simplified design to reduce the cost, with a resulting tradeoff in performance. The simple design limits the dynamic range and the tolerance to distortion and voice interference.

Most home answering machines have a receiver which can detect a single tone. This tone is generated by a portable tone generator which the user holds up to the telephone after dialing his home number from a remote location.

Due to the pervasiveness and standardization of DTMF pushbutton phones, the use of single tones for communication has been relatively ignored, while DTMF receivers have proliferated. The single tones which can be produced by a pushbutton phone have been used to increase the complexity of input data to a DTMF receiver for a computer as shown by James, above. For devices coupled to a home telephone, separate single-tone generators and receivers are commonly used. These single-tone receivers use only one tone which is unrelated to the single tones of a pushbutton telephone.

SUMMARY OF THE INVENTION

The present invention is a single-tone receiver for a device which only needs simple data which can be encoded in the seven or eight single tones which can be generated by an ordinary pushbutton telephone. A telephone line interface circuit receives a signal from the telephone line. The input signal is not filtered to separate the high-frequency tones from the low-frequency tones prior to their detection. A zero crossing detector coupled to the telephone line interface detects zero crossings of a received single-tone input signal. A microprocessor coupled to the zero crossing detector counts the number of zero crossings in a period and compares the count to counts corresponding to each of the seven single-tone frequencies.

The present invention recognizes that single tones can be used to simplify a receiver for certain applications. The prior art used single tones to add to the capability and complexity of a DTMF system. The present invention combines the single-tone frequencies available from an ordinary pushbutton phone with a device which does not need a DTMF receiver. The present invention vastly simplifies the detection of data in the form of tone signals by detecting only a single-tone frequency. This eliminates the need for high and low band pass filters and thereby simplifies and greatly reduces the cost of the receiver unit. This simplification and reduced cost makes it economically feasible for such a unit to be used with simple devices which only require limited data input. These devices can thus be used with an ordinary telephone. This simplification and reduced cost is achieved at the small inconvenience of having to input single tones rather than dual tones.

The present invention can be used for a number of applications, such as for controlling a telephone answering machine by inputting single-tone frequencies from a remote telephone and, similarly, remotely controlling and monitoring household appliances. In addition, the receiver provides a simple method for programming an auto-dialer for use with a home telephone. Unless pre-programmed, such an auto-dialer would need a DTMF receiver or some kind of manual switches. Such an auto-dialer can be programmed using the present invention by using single tones. This is most effectively done remotely by having a computer at a central location input the desired single-tone digits into the auto-dialer.

BRIEF DESCRIPTION OF THE DRAWINGS

FIG. 1 is a block diagram of the preferred embodiment of the present invention.

FIG. 2 is a schematic diagram of the invention of FIG. 1, further including a tone transmitter.

DETAILED DESCRIPTION OF THE PREFERRED EMBODIMENT

FIG. 1 is a block diagram of a single-tone receiver 10 of the present invention. A telephone interface 12 is coupled to a tip signal line 14 and a ring signal line 16 of an ordinary telephone. Telephone interface 12 provides power to the remainder of receiver 10 via a power line 18. A wakeup signal 20 is supplied from telephone interface 12 to a microprocessor 22. A zero-crossing detector 24 receives the telephone input signal from telephone interface 12 via signal line 26. The detected zero-crossings from zero-crossing detector 24 are supplied to microprocessor 22 via a signal line 28.

A single-tone frequency is detected by the circuit of FIG. 1 as follows. Upon the detection of a zero-crossing by zero-crossing detector 24, a counter A in microprocessor 22 is incremented. The preferred method is by connecting zero-crossing detector 24 to an interrupt input on microprocessor 22. The operations of microprocessor 22 are then interrupted upon a zero-crossing, and the microprocessor program is directed to a counter A which is incremented. Microprocessor 22 then returns to its interrupted operation. The zero-crossings are accumulated for a period of 40 milliseconds. After 40 milliseconds have elapsed, the count of counter A is compared to a range of counts which are indicative of each of the single-tone frequencies. If the count is in a frequency count range, a second counter B corresponding to that frequency is incremented. The frequency ranges corresponding to the count ranges for each single-tone frequency are as follows:

| Frequency (Hz) | Range (Hz) |
| --- | --- |
| 697 (Row 1) | 630–720 |
| 770 (Row 2) | 750–790 |
| 852 (Row 3) | 840–870 |
| 941 (Row 4) | 900–970 |
| 1209 (Col. 1) | 1190–1230 |
| 1336 (Col. 2) | 1250–1380 |
| 1477 (Col. 3) | 1410–1580 |

The incrementing of counter B indicates a hit, or an initial indication that a single-tone frequency is present. In the preferred embodiment, it is arbitrarily required that three consecutive hits be recorded before a single-tone frequency is determined to be present. Thus the above procedure is repeated for a period of approximately 120 milliseconds to allow for three 40 millisecond periods to pass.

FIG. 2 shows a detailed schematic of the invention of FIG. 1. Telephone interface 12 includes a rectifier circuit 30 which receives the input signals from tip and ring lines 14, 16. An off-hook detector 32 is coupled to rectifier 30. Off-hook detector 32 is comprised of a Zener diode 34, resistors 36, 38, 40, 42 and 44 and transistors 46 and 48. Off-hook detector 32 detects the presence of an off-hook condition of the telephone. The detection of an off-hook condition is transmitted to microprocessor 22 via wake-up line 20.

A power field effect transistor 50 is used to regulate the power coupled to line 18 for supplying power to microprocessor 22 and zero-crossing detector 24. A capacitor 58 stabilizes the power supply voltage on line 18. The drain of transistor 50 is coupled to a line 26 which provides the input signal to zero-crossing detector 24.

In zero-crossing detector 24, line 26 is coupled to a pair of operational amplifiers 52, 54 via a capacitor 56. The output of operational amplifier 54 is coupled to the interrupt pin of microprocessor 22 via line 28. The input signal from line 26 is transformed into a square wave by amplifiers 52, 54 on output line 28. Operational amplifier 52, 54 is preferably a low-power CMOS two-stage operational amplifier such as an Intersil part No. ICL7621. Equivalent parts are available from Texas Instruments, Motorola and Raytheon.

An input line 60 to zero-crossing detector 24 is coupled to microcomputer 22 for switching on and off the amplifier power. This allows power to be switched off, thereby conserving current in the quiescent on-hook mode and reducing noise when the amplifiers 52, 54 are not used. When amplifiers 52, 54 are turned on, a small amount of audio noise is introduced into the phone line.

Amplifier 52, 54 preferably has a dynamic range between 10 DBM and −60 DBM. Amplifier 52, 54 also operates from a low voltage of 3 volts between the positive and negative supplies and has a bias current of 100 microamps or less.

Microprocessor 22 can be a Sanyo four-bit CMOS microcomputer, part No. LC6505, or an equivalent device.

A tone transmitter 62 can be a touch-tone generator which can transmit data in both the single and dual tone formats, such as American Microsystems' part No. 2559F tone generator. A color crystal 64 coupled to tone generator 62 controls its frequency.

The operation of the circuit of FIG. 2 for the specific application of programming an auto-dialer will now be described. Upon initial installation, by holding the telephone off-hook for three seconds or more without inputting a tone, or by inputting a designated tone, microprocessor 22 transmits a telephone number stored in its random access memory to tone transmitter 62. Tone transmitter 62 will provide a transmitted tone via line 26 to the telephone line 14, 16. This stored telephone number dials a central office location which is used to program microprocessor 22. Instructions will be provided to the user from the central office. The user can input via DTMF tones the telephone number and access code of his long-distance system (i.e., MCI, Sprint, etc.) The central office computer will translate the DTMF signals into single-tone signals and transmit them to receiver 10 where they will be received and stored in the random access memory of microcomputer 22. The single-tone signals are detected in the manner described in connection with FIG. 1 above.

Thereafter, when the user desired to utilize the auto-dialer, he either holds the telephone off-hook for three seconds without inputting a tone signal or inputs a designated tone signal to activate the auto-dialer program in microcomputer 22. Upon activation, the telephone number stored in the RAM of microprocessor 22 will be sent to tone transmitter 62 for dialing. After dialing, zero-crossing detector 24 will detect, in conjunction with microprocessor 22, the dial tone received after the long-distance service is accessed. The dial tone frequency is detected in the same manner as the single-tone frequencies as described above. Upon receipt of this dial tone, microprocessor 22 will cause tone transmitter 62 to send the access code stored in the RAM of the microprocessor. Thereafter, microprocessor 22 will instruct tone transmitter 62 to transmit a tone signal which will indicate to the user that the long-distance access has been completed and the telephone number desired to be dialed may now be entered.

As will be understood by those familiar with the art, the present invention may be embodied in other specific forms without departing from the spirit or essential characteristics thereof. For example, receiver 10 could be used to remotely activate, monitor or control an answering machine or other appliances or systems. Accordingly, a disclosure of the preferred embodiment of the present invention is intended to be illustrative, but not limiting, of the scope of the invention, which is set forth in the following claims.

What is claimed is:

1. A single-tone signal receiver and data input apparatus for a device operable with input data comprising:
    a telephone line interface, adapted to couple to a local two wire telephone line, for receiving a single-tone input signal from the telephone line;
    means coupled to said interface for detecting the zero-crossings of said single-tone input signal;
    a memory for storing count ranges representing the number of zero-crossings in a designated period of each of up to eight single-tone frequencies;
    means, coupled to said zero-crossing detector, for incrementing a count in response to each detected zero-crossing during said designated period;
    means for comparing said count at the end of said period to said count ranges in said memory;
    means for indicating detection of a single tone when said count at the end of said period is within one of said count ranges;
    means for decoding said single-tone frequencies;
    means for transmitting said input data represented by said detected single tones to said device; p1 means for supplying power to said apparatus from a voltage on said telephone line;
    means for detecting an off-hook condition on said telephone line and generating an off-hook signal; and
    means, responsive to said off-hook signal, for activating said power supply means.

2. A method for inputting data to a device comprising the steps of:
    generating single tones at a remote source coupled to said telephone line corresponding to a telephone number and access code and storing said data signals in a memory in said device;
    receiving a plurality of single-tone signals from a telephone line;
    detecting the zero-crossings of said single-tone signals;
    counting the number of said zero-crossings in a designated period;
    comparing the counted number of zero-crossings to a plurality of count ranges corresponding to single-tone frequencies;
    providing a signal indicative of a particular single-tone frequency when said counted number of zero-crossings falls within one of said ranges; and
    decoding a plurality of signals indicating particular single-tone frequencies to produce data signals.

3. A method for inputting data to an autodialer comprising the steps of:
    receiving a plurality of single-tone signals from a telephone line;
    detecting the zero-crossings of said single-tone signals;
    counting the number of said zero-crossings in a designated period;
    comparing the counted number of zero-crossings to a plurality of count ranges corresponding to single-tone frequencies;
    providing a signal indicative of a particular single-tone frequency when said counted number of zero-crossings falls within one of said ranges;
    decoding a plurality of signals indicating particular single-tone frequencies to produce data signals;
    inputting said data signals to said autodialer;
    accessing a memory location in said autodialer;
    transmitting a telephone number stored at said memory location;
    detecting a dial tone after transmission of said telephone number; and
    transmitting an access code stored at said memory location after detection of said dial tone.

* * * * *